(12) United States Patent
Zeituni et al.

(10) Patent No.: US 12,713,160 B2
(45) Date of Patent: Aug. 18, 2026

(54) COLUMN SIGNAL PROCESSING UNIT AND SOLID-STATE IMAGING DEVICE

(71) Applicant: Sony Semiconductor Solutions Corporation, Atsugi (JP)

(72) Inventors: Golan Zeituni, Stuttgart (DE); Noam Zeev Eshel, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 322 days.

(21) Appl. No.: 18/276,647

(22) PCT Filed: Feb. 17, 2022

(86) PCT No.: PCT/EP2022/053950
§ 371 (c)(1),
(2) Date: Aug. 10, 2023

(87) PCT Pub. No.: WO2022/179931
PCT Pub. Date: Sep. 1, 2022

(65) Prior Publication Data
US 2024/0107202 A1 Mar. 28, 2024

(30) Foreign Application Priority Data
Feb. 23, 2021 (EP) .................................... 21158776

(51) Int. Cl.
*H04N 25/78* (2023.01)

(52) U.S. Cl.
CPC .................................. *H04N 25/78* (2023.01)

(58) Field of Classification Search
CPC ....... H04N 25/78; H04N 25/00; H04N 25/671
See application file for complete search history.

(56) References Cited

U.S. PATENT DOCUMENTS

| | | | | |
|---|---|---|---|---|
| 5,122,881 | A | 6/1992 | Nishizawa et al. | |
| 6,674,470 | B1 | 1/2004 | Tanaka et al. | |
| 2009/0033782 | A1 | 2/2009 | Muroshima et al. | |
| 2016/0225807 | A1 * | 8/2016 | Koifman | H04N 25/78 |

FOREIGN PATENT DOCUMENTS

| | | | |
|---|---|---|---|
| EP | 3664440 | A1 | 6/2020 |

OTHER PUBLICATIONS

International Search Report and Written Opinion mailed on May 12, 2022, received for PCT Application PCT/EP2022/053950, filed on Feb. 17, 2022, 9 pages.

* cited by examiner

*Primary Examiner* — Nicholas G Giles
(74) *Attorney, Agent, or Firm* — XSENSUS LLP

(57) ABSTRACT

A column signal processing unit includes a current control circuit (110) and a feedback circuit (120). The current control circuit (110) is electrically connected between a data signal line (VSL) and a supply reference potential (GND). The feedback circuit (120) is configured to reduce a capacitive load of the data signal line (VSL). A feedback path (121) of the feedback circuit (120) includes a series connection of a feedback capacitor (122) and a delay element (123), wherein the delay element (123) is configured to increase a time delay in the feedback path (121).

16 Claims, 16 Drawing Sheets

11
14
10
22
DA CONVERTER
11P
C2
23
24
COUNTER
C1
Vout
VDD
AMP
SEL
VSL
120
110
GND
DPXS
80
SIGNAL PROCESSING UNIT
RST
TG
PD
Ctrl1
13
12
DRIVING
TIMING
ADDRESS
SIGNAL
LATC
SENSOR
CONTROLLER
15
IMAGE SENSOR ASSEMBLY

Ev
301
11P
PR
Vpr
PRC
SL1
C
A
Iphoto
PD
11I
SL2
RST
VDD
AMD
SEL
VDD
300
VSL
Ctrl1
110
120
Column Amplifier
14

920
BPD
910
OPN
23020

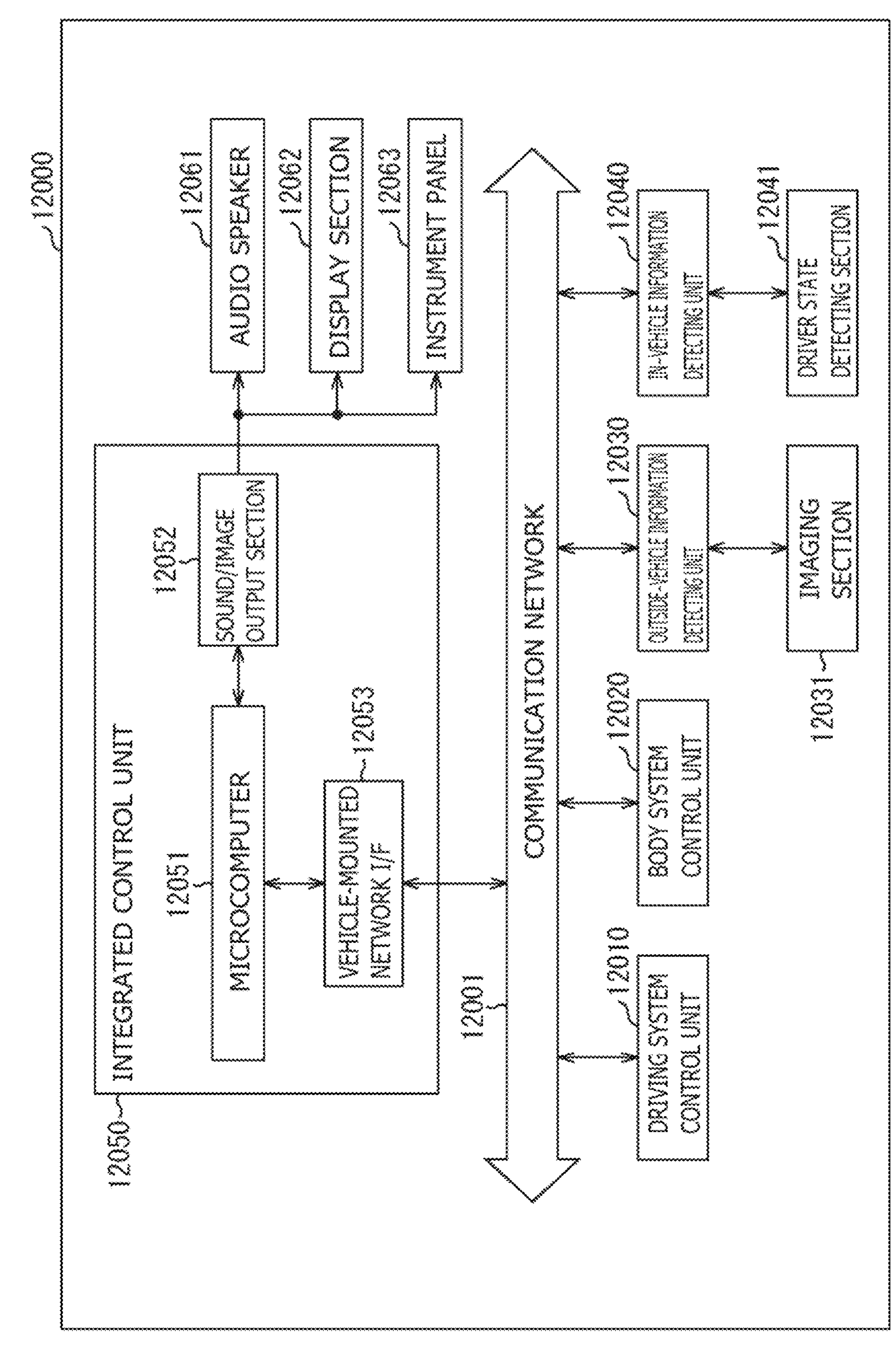
FIG 15
12000
12050
INTEGRATED CONTROL UNIT
12051
MICROCOMPUTER
12052
SOUND/IMAGE OUTPUT SECTION
12053
VEHICLE-MOUNTED NETWORK I/F
12061
AUDIO SPEAKER
12062
DISPLAY SECTION
12063
INSTRUMENT PANEL
12001
COMMUNICATION NETWORK
12010
DRIVING SYSTEM CONTROL UNIT
12020
BODY SYSTEM CONTROL UNIT
12030
OUTSIDE-VEHICLE INFORMATION DETECTING UNIT
12031
IMAGING SECTION
12040
IN-VEHICLE INFORMATION DETECTING UNIT
12041
DRIVER STATE DETECTING SECTION

COLUMN SIGNAL PROCESSING UNIT AND SOLID-STATE IMAGING DEVICE

CROSS-REFERENCE TO RELATED APPLICATIONS

The present application is based on PCT filing PCT/EP2022/053950, filed Feb. 17, 2022, and claims priority to EP Application Serial No. 21158776.1, filed Feb. 23, 2021, the entire contents of each are incorporated herein by reference.

BACKGROUND

Image sensors in solid-state imaging devices include photoelectric conversion elements generating a photocurrent in proportion to the received radiation intensity. The main function of a pixel circuit is to transform the small photocurrent generated by the photoelectric conversion element into a comparatively large output voltage which a downstream analog-to-digital converter converts into a digital signal. Typically, a plurality of pixel circuits assigned to a pixel circuit column share one single data signal line on which the pixel output signals are output individually in a time multiplex regime and a column signal processing unit sequentially receives and processes the pixel output signals. The data signal line is comparatively long and the parasitic capacitance of the data signal line therefore comparatively high. Increasing capacitance slows down signal transmission on the data signal line. Various approaches aim at reducing the parasitic capacitance. For example, a current mirror circuit may supply a compensation current to the data signal line, wherein the compensation current is proportional to the degree of a potential drop on the data signal line.

SUMMARY

Today, there is an ongoing need for solid-state imaging devices with small outline, high resolution, low power consumption and fast image capturing. The present disclosure has been made in view of the above circumstances, and it is therefore desirable to provide a column signal processing unit and a solid-state imaging device combining area efficiency and high image capturing rates.

According to an embodiment, a column signal processing unit includes a current control circuit and a feedback circuit. The current control circuit is electrically connected between a data signal line and a supply reference potential. The feedback circuit is configured to reduce a capacitive load of the data signal line. A feedback path of the feedback circuit includes a series connection of a feedback capacitor and a delay element, wherein the delay element is configured to increase a time delay in the feedback path.

According to a further embodiment, a solid-state imaging device includes a plurality of pixel circuits and a column signal processing unit. Each pixel circuit is configured to generate a pixel output signal with an amplitude related to an intensity of detected light. The pixel circuits are connected to a data signal line.

The column signal processing unit includes a current control circuit and a feedback circuit. The current control circuit is electrically connected between a data signal line and a supply reference potential. The feedback circuit is configured to reduce a capacitive load of the data signal line. A feedback path of the feedback circuit includes a series connection of a feedback capacitor and a delay element, wherein the delay element is configured to increase a time delay in the feedback path.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a simplified circuit diagram of a pixel circuit with simultaneous intensity readout and event detection.

FIG. 11 is a simplified circuit diagram of a pixel circuit switchable between intensity readout and event detection.

FIG. 15 is a block diagram depicting an example of a schematic configuration of a vehicle control system.

DETAILED DESCRIPTION

Figure 1:
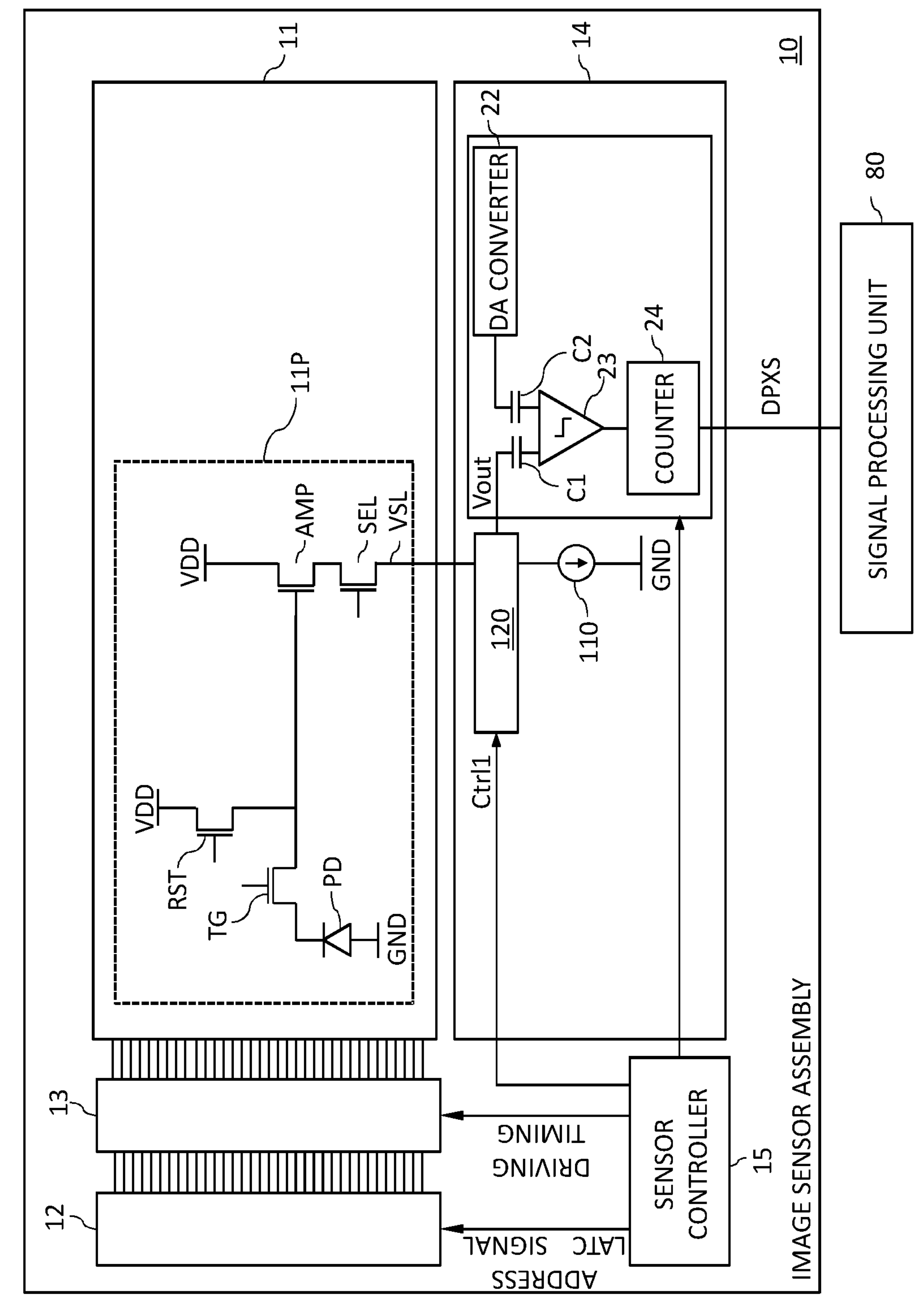
FIG. 1 is a simplified block diagram illustrating an embodiment of a solid-state imaging device according to an embodiment of the present technology.

Referring now to the drawings, like reference numerals designate identical or corresponding parts throughout the several views. Though in the following a technology for increasing area efficiency of column signal processing units and/or the image capturing rate of solid-state imaging devices without increase of power consumption is described in the context of certain types of active image sensors, the technology may also be used for other types of image sensors.

FIG. 1 illustrates a configuration example of a solid-state imaging device 90 including an image sensor assembly 10 and a signal processing unit 80 according to an embodiment of the present technology.

The image sensor assembly 10 may include a pixel array unit 11, a row decoder 12, a pixel driver unit 13, a column signal processing unit 14, and a sensor controller 15.

The pixel array unit 11 includes a plurality of pixel circuits 11P. Each pixel circuit 11P includes a photoelectric conversion device PD and a number of FETs (field effect transistors) for controlling the signal output by the photoelectric conversion device PD. The photoelectric conversion devices PD may be arranged matrix-like in columns and rows. A subset of pixel circuits 11P assigned to the same column of photoelectric conversion devices PD forms a pixel column. The outputs of the pixel circuits 11P of the same pixel column are successively supplied to a data signal line (vertical signal line) VSL.

The row decoder 12 and the pixel driver unit 13 control driving of each pixel circuit 11P disposed in the pixel array unit 11. In particular, the row decoder 12 may supply a control signal for designating the pixel circuit 11P or the row of pixel circuits 11P to be driven to the pixel driver unit 13 according to an address signal from the sensor controller 15. The pixel driver unit 13 may drive the FETs of the pixel circuit 11P according to driver timing signals supplied from the sensor controller 15 and the control signal supplied from the row decoder 12.

The output signals of the pixel circuits 11P (pixel output signals) are supplied through the data signal lines VSL to the column signal processing unit 14.

For pixel circuits 11P implementing intensity readout, the column signal processing unit 14 may include one or more ADCs (analog-to-digital converters 20. The column signal processing unit 14 may include as much ADCs 20 as the pixel array unit 11 includes data signal lines VSL. Alternatively, the number of ADCs 20 may be lower than the number of data signal lines VSL and each ADC 20 may be multiplexed between two or more of the data signal lines VSLs. Each ADC 20 performs an analog-to-digital conversion on the pixel output signals successively passed from the pixel column and passes digital pixel data DPXS to the signal processing unit 80. To this purpose, each ADC 20 may include a comparator 23, a digital-to-analog converter (DAC) 22 and a counter 24.

For pixel circuits 11P implementing event detection, digital circuits, e.g. latches, registers, or other type of memory elements may be provided instead of the ADC 20.

The sensor controller 15 controls the other components of the image sensor assembly 10. For example, the sensor controller 15 may supply the address to the row decoder 12, and may supply the driving timing signal to the pixel driver unit 13. In addition, the sensor controller 15 may supply one or more control signals for controlling the column signal processing unit 14, e.g. the ADC 20.

The pixel circuits 11P may be any active pixel sensors for event detection and/or intensity readout. The illustrated example refers to pixel circuits 11P for intensity readout with one photoelectric conversion element PD and four transistors (FETs) as active elements.

The photoelectric conversion element PD may include or may be composed of, for example, a photodiode. The FETs may include a transfer transistor TG, a reset transistor RST, an amplification transistor AMP, and a selection transistor SEL.

The photoelectric conversion element PD photoelectrically converts incident light into electric charges (here, electrons). The amount of electric charge generated in the photoelectric conversion element PD corresponds to the amount of the incident light.

The transfer transistor TG is connected between the photoelectric conversion element PD and a floating diffusion region FD. The transfer transistor TG serves as transfer element for transferring charge from the photoelectric conversion element PD to the floating diffusion region FD. The floating diffusion region FD serves as temporary local charge storage. A transfer signal serving as a control signal is supplied to the gate (transfer gate) of the transfer transistor TG through a transfer control line.

Thus, the transfer transistor TG may transfer electrons photoelectrically converted by the photoelectric conversion element PD to the floating diffusion FD.

The reset transistor RST is connected between the floating diffusion FD and a power supply line to which a positive supply voltage VDD is supplied. A reset signal serving as a control signal is supplied to the gate of the reset transistor RST through a reset control line.

Thus, the reset transistor RST serving as a reset element resets a potential of the floating diffusion FD to that of the power supply line supplying the positive supply voltage VDD.

The floating diffusion FD is connected to the gate of the amplification transistor AMP serving as an amplification element. The floating diffusion FD functions as the input node of the amplification transistor AMP.

The amplification transistor AMP and the selection transistor SEL are connected in series between the power supply line and the data signal line VSL.

Thus, the amplification transistor AMP is connected to the data signal line VSL through the selection transistor SEL and constitutes a source-follower circuit with a current control circuit 110 formed as part of the column signal processing unit 14. The current control circuit 100 may be configured to be effective as constant current source.

Then, a selection signal serving as a control signal corresponding to an address signal is supplied to the gate of the selection transistor SEL through a selection control line, and the selection transistor SEL is turned on.

When the selection transistor SEL is turned on, the amplification transistor AMP amplifies the potential of the floating diffusion FD and outputs a voltage corresponding to the potential of the floating diffusion FD to the data signal line VSL. The data signal line VSL transfers a pixel output signal from the pixel circuit 11P to the column signal processing unit 14.

Since the respective gates of the transfer transistor TG, the reset transistor RST, and the selection transistor SEL are, for example, connected in units of rows, these operations may be simultaneously performed for each of the pixel circuits 11P of one row.

The amplifier transistor AMP of the pixel circuit 11P and the current control circuit 110 complement to a source follower circuit passing the pixel output signal Vout to the column signal processing unit 14. The column signal processing unit 14 transforms the received pixel output signals into digital pixel data and passes the digital pixel data to the signal processing unit 80.

The column signal processing unit 14 further includes a feedback circuit 120 connected to the data signal line VSL between the pixel array unit 11 and the current control circuit 110. The feedback circuit 120 reduces the effective capacitive load of the data signal line VSL and contributes in reducing a pixel signal settling time for a given pixel current, or in facilitating a lower pixel current for a given pixel signal settling time.

The following figures show details of the feedback circuit 120 illustrated in FIG. 1.

Figure 2:
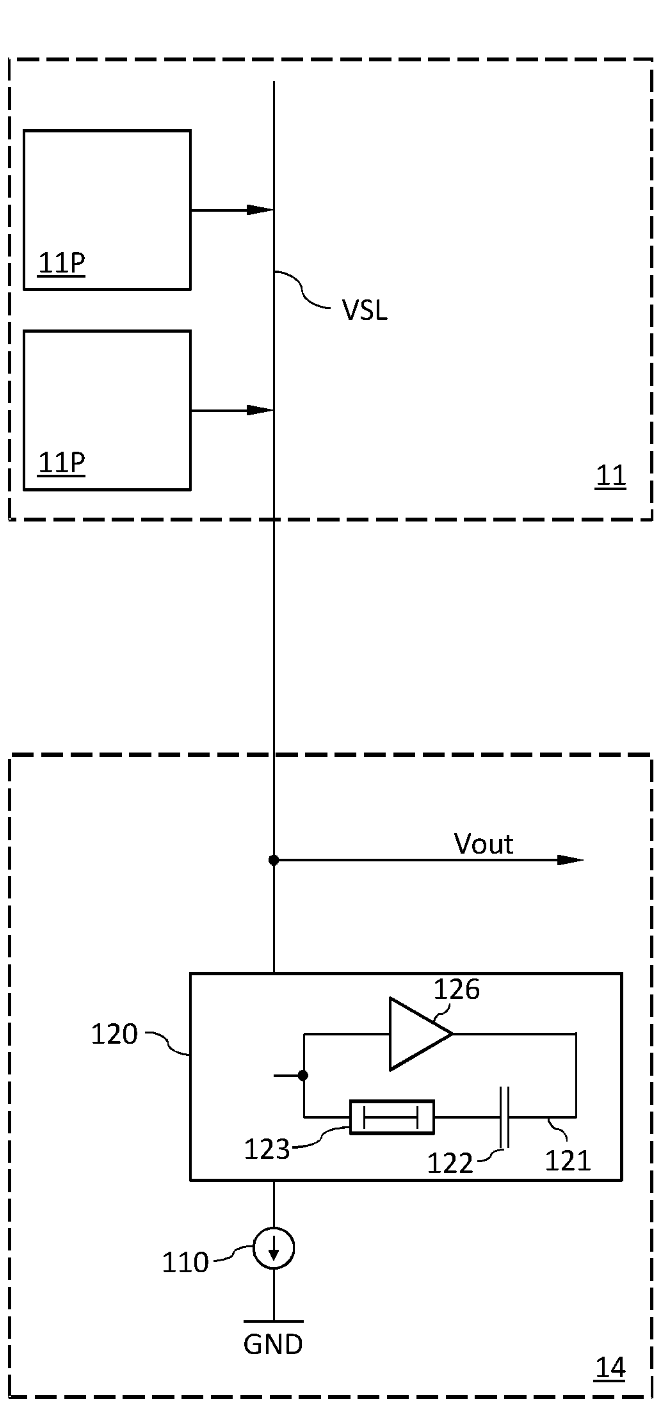
FIG. 2 is a simplified block diagram illustrating a configuration example of a part of column signal processing unit including a feedback circuit that is configured to reduce a capacitive load of a data signal line and that includes a delay element in the feedback path according to an embodiment.

FIG. 2 shows a pixel array unit 11 with pixel circuits 11P connected to a data signal line VSL. The data signal line VSL extends from the pixel array unit 11 to a column signal processing unit 14.

The column signal processing unit 14 includes a current control circuit 110 which is electrically connected between the data signal line VSL and a supply reference potential GND. A feedback circuit 120 reduces a capacitive load of the data signal line VSL, wherein a feedback path 121 of the feedback circuit 120 includes a series connection of a feedback capacitor 122 and a delay element 123. The delay element 123 increases a time delay in the feedback path 121.

The current control circuit 110 may include a constant current source delivering or absorbing an electric current through the data signal line VSL, wherein the electric current is independent of the voltage across the current control circuit 110.

The feedback circuit 120 is connected to the data signal line VSL and includes a feedback amplifier 126 and a positive feedback path 121 with a feedback capacitor 122. The feedback circuit 120 operates in a way that is equal to or at least similar to connecting a negative capacitance to the data signal line VSL. The negative capacitance reduces the effect of the parasitic capacitance of the data signal line VSL on the signal form of voltage signals on the data signal line VSL. In each case, with the feedback circuit 120 signal transitions of a pixel output signal Vout tapped from the data signal line VSL between the pixel array unit 11 and the feedback circuit 120 appear as if the parasitic capacitance of the data signal line VSL was reduced.

At a given pixel current load, the feedback circuit 120 speeds up signal settling performance, i.e. reduces the time until an analog signal on the data signal line VSL reaches a constant level. As a result, readout speed can be increased. For a given signal settling performance or readout speed, it is possible to drive the pixel circuit 11P at reduced pixel current load. As a result, power consumption may be reduced.

The delay element 123 may include a resistive element and/or a biased transistor connected in series to the feedback capacitor 122, by way of example. The delay element 123 increases a time delay between the input and the output of the positive feedback path 121. With the additional time delay obtained from the delay element 123, it is possible to reduce significantly the capacitance of the feedback capacitor 122 without significant adverse impact on pixel current load and signal settling time.

For example, the feedback circuit 120 may be a one-port op-amp circuit acting as a negative load which temporarily injects energy into the circuit of the data signal line VSL.

Figure 3:
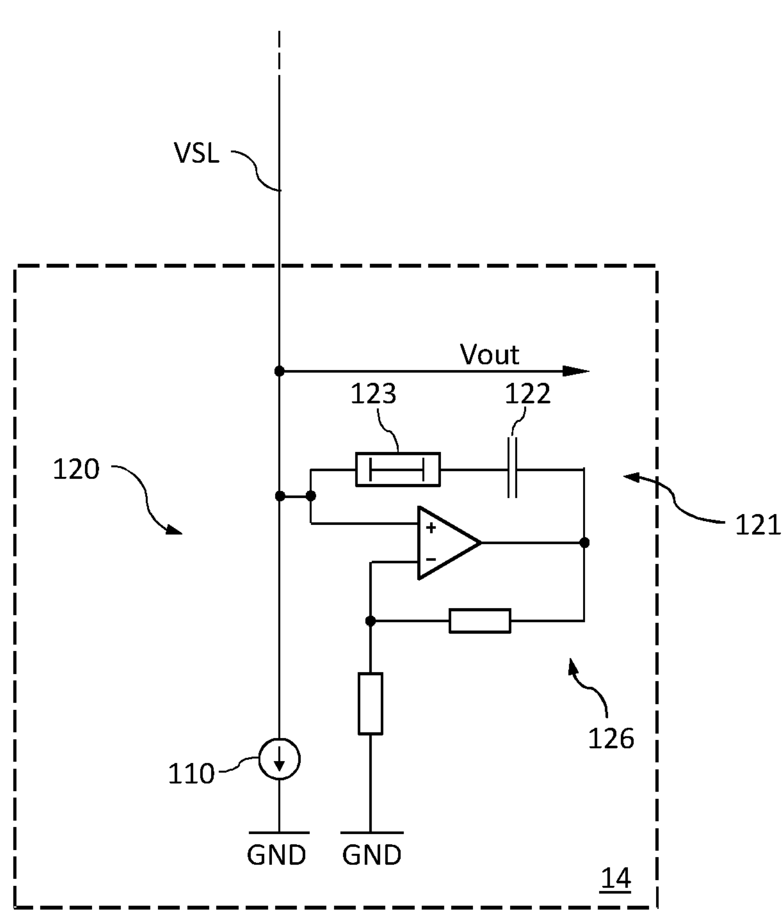
FIG. 3 is a simplified circuit diagram illustrating a configuration example of a part of a column signal processing unit according to an embodiment including a feedback circuit with an amplifier having a gain greater “1”.

In FIG. 3 the feedback circuit 120 includes a negative impedance converter with current inversion. The amplifier circuit 126 includes an operational amplifier and a resistive voltage divider between the output of the operational amplifier, the inverting input of the operational amplifier, and the supply reference potential GND. The feedback path 121 connects the output of the operational amplifier and the non-inverting input with the data signal line VSL. The gain of the amplifier circuit 126 is greater 1. The feedback circuit 120 is configured as one-port op-amp circuit acting as a negative capacitive load which injects energy into the circuit of the data signal line VSL when a signal level on the data signal line VSL changes.

Figure 4:
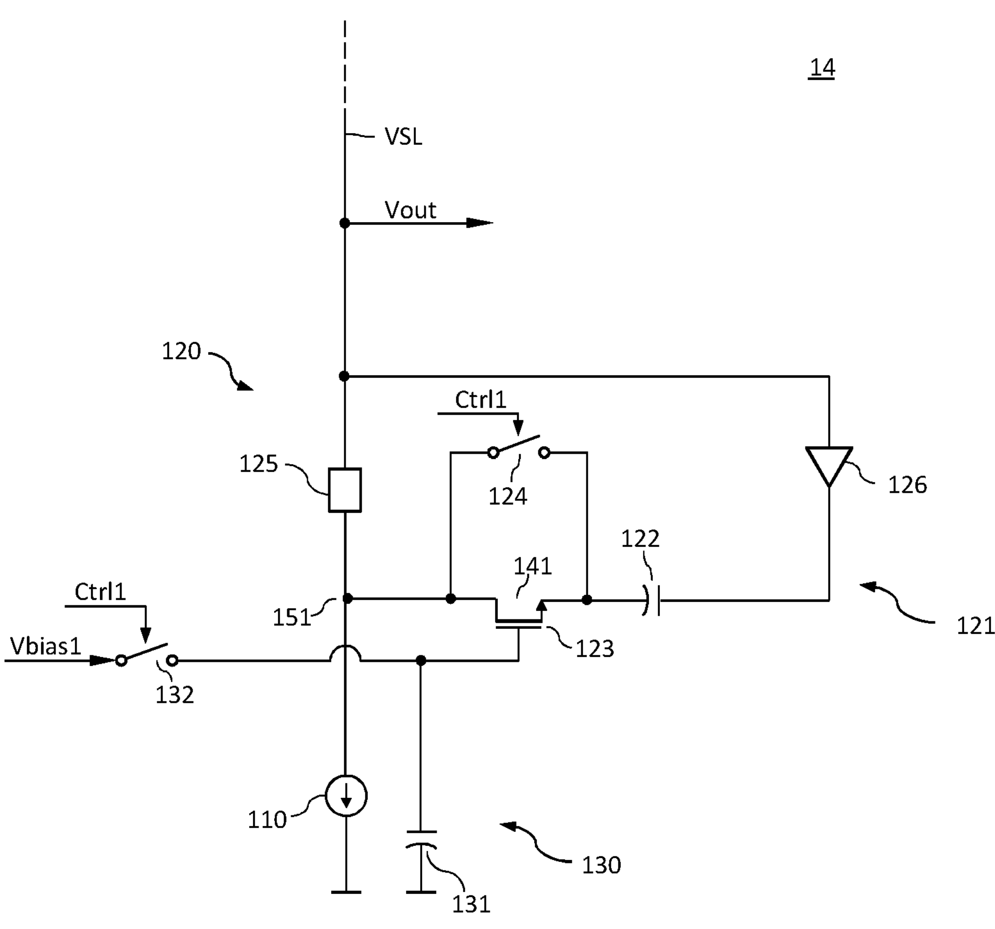
FIG. 4 is a simplified circuit diagram illustrating a configuration example of a part of a column signal processing unit according to an embodiment including the delay element configured as a resettable resistor.

In the column signal processing unit of FIG. 4, the feedback circuit 120 further includes a first switch 124, wherein the delay element 123 and the first switch 124 are electrically connected in parallel. Turning on the first switch 124 allows to short-circuit the delay element 123 and to pre-charge the feedback capacitor 122, for example during a pre-charge period of the column signal processing unit 14. For a readout period of the column signal processing unit 14, the first switch 124 may be turned off such that the delay element 123 efficiently delays the signal in the positive feedback path 121.

The delay element 123 may include the load path of a first transistor 141. The first transistor 141 may be an n channel FET (nFET), which can be realized with comparatively low lateral dimensions in a semiconductor substrate.

The column signal processing unit 14 may further include a transistor bias circuit 130 that at least during the readout period supplies a first bias voltage Vbias1 to a gate of the first transistor 141 for precisely adjusting the electric resistance of the delay element 123.

The transistor bias circuit 130 may include a bias voltage capacitor 131 and a second switch 132, wherein the bias voltage capacitor 131 is connected between the gate of the first transistor 141 and the supply reference potential GND, and wherein the second switch 132 is configured to connect the bias voltage capacitor 132 with a bias voltage source supplying a first bias voltage Vbias1. The second switch 132 may be "off" at least during a readout period and may be "on" during at least a part of a pre-charge period for the data signal line VSL.

Both the controllable first switch 124 electrically connected in parallel with the delay element 123 in the feedback path 121 and the second switch 132 in the transistor bias circuit 130 may be controllable through the first control signal Ctrl1. In other words, the first switch 124 and the second switch 132 may approximately turn on simultaneously and may approximately turn off simultaneously.

The feedback circuit 120 may further include an amplifier circuit 126, wherein an input of the amplifier circuit 126 is connected to the data signal line VSL, and wherein an output of the amplifier circuit 126 is connected to a second side of the feedback path 121.

The feedback circuit 120 may further include a sense element 125 connected in series between the data signal line VSL and the current control circuit 110, wherein a first side of the feedback path 121 is connected to a first node 151 between the sense element 125 and the current control circuit 110.

With the sense element 125, the feedback circuit 120 may measure the pixel output signal Vout in order to speed up the settling performance and reduce readout time, or in order to reduce the pixel current load and power consumption.

During a transition of the pixel output signal Vout from a high level to a low level, the positive feedback may increase the pixel current load. During a transition of the pixel output signal Vout form a low to a high level, the positive feedback decreases the pixel current load. In this way, the feedback circuit 120 acts as VSL accelerator that accelerates settling time for both rising and falling transitions of the pixel output signal Vout on the data signal line VSL.

Figure 5:
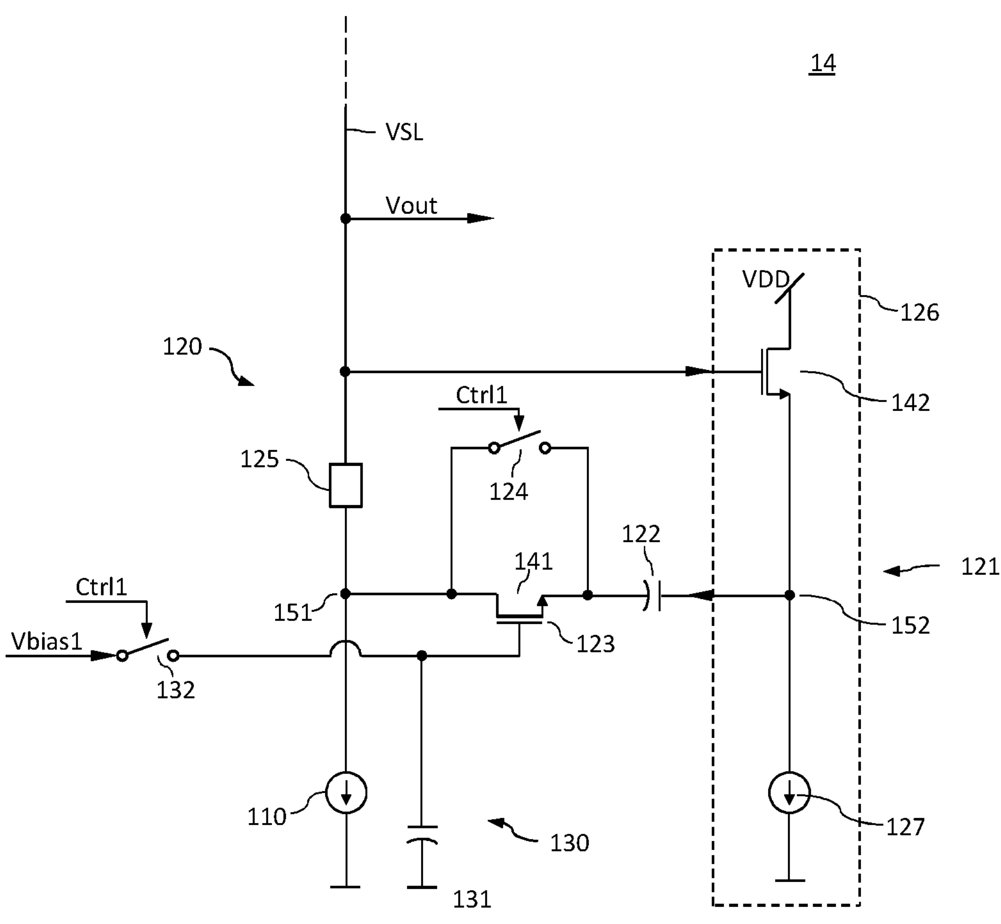
FIG. 5 is a simplified circuit diagram illustrating a configuration example of a part of a column signal processing unit according to an embodiment with the feedback circuit including a sense element between the data signal line and the current control circuit.

As illustrated in FIG. 5, the amplifier circuit 126 may include a second transistor 142 and a constant current source circuit 127. A load path of the second transistor 142 and the constant current source circuit 127 are electrically connected in series between a positive supply voltage VDD and the supply reference potential GND. The input of the amplifier circuit 126 is connected to a gate of the second transistor 142. The second side of the feedback path 121 is connected to a second node 152 between the second transistor 142 and the constant current source circuit 127.

Figure 6:
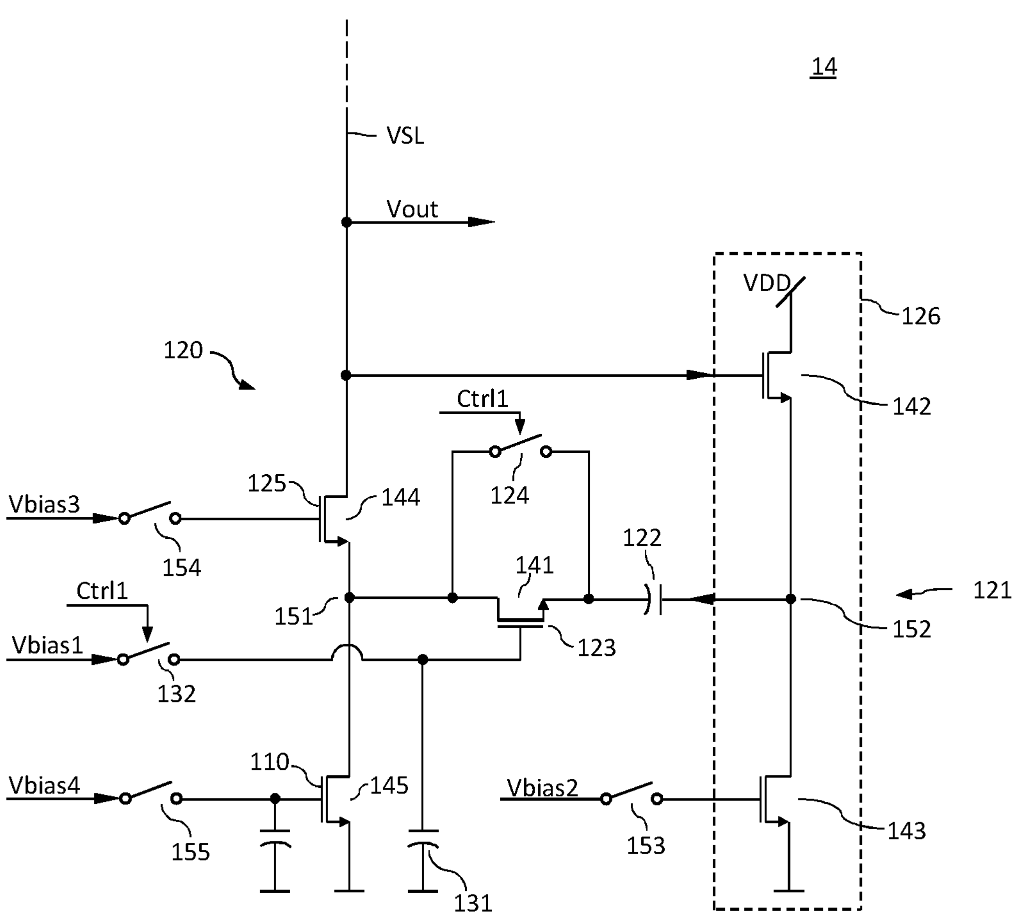
FIG. 6 is a simplified circuit diagram illustrating a configuration example of a part of a column signal processing unit according to an embodiment with current sources configured as transistors with biased gates.

According to FIG. 6 the amplifier circuit 126 may include the second transistor 142 and a third transistor 143, wherein the load paths of the second transistor 142 and the third transistor 143 are electrically connected in series, wherein the third transistor 143 operates as constant current sources, and wherein the input of the amplifier circuit 126 is connected to a gate of the second transistor 142.

The second and the third transistors 142, 143 may be nFETs. The feedback circuit 120 may include a third switch 153 configured to connect the gate of the third transistor 143 with a bias voltage source supplying a second bias voltage Vbias2. The second switch 132 may be "off" at least during a readout period and may be "on" during at least a part of a pre-charge period for the data signal line VSL Further in the feedback circuit of FIG. 6, the sense element 125 includes a fourth transistor 144 and the current control circuit 110 includes a fifth transistor 145.

The fourth and the fifth transistors 144, 145 may be nFETs. The feedback circuit 120 may include a fourth switch 154 configured to connect the gate of the fourth transistor 144 with a bias voltage source supplying a third bias voltage Vbias3. The fourth switch 154 may be "off" at least during a readout period and may be "on" during at least a part of a pre-charge period for the data signal line VSL The feedback circuit 120 may include a fifth switch 155 configured to connect the gate of the fifth transistor 145 with a bias voltage source supplying a fourth bias voltage Vbias4. The fifth switch 155 may be "off" at least during a readout period and may be "on" during at least a part of a pre-charge period for the data signal line VSL The bias voltages Vbias1, Vbias2, Vbias3, Vbias4 may differ from each other. According to other examples, at least two, at least three or all four bias voltages Vbias1, Vbias2, Vbias3, Vbias4 may have the same voltage level.

The feedback path 121 is connected between a first node 151 between the fourth and fifth transistors 144, 145 and a second node 152 between the second and third transistors 142, 143.

Each switch 124, 132, 153, 154, 155 may include one or more FETs. For example, each switch 124, 132, 153, 154, 155 may be or may include a transfer gate.

The fifth transistor 145 and the fourth transistor 144 may have the same gate width. In addition, the gates of the fifth transistor 145 and the fourth transistor 144 may be connected to each other. Then the fifth transistor 145 and the fourth transistor 144 may be formed in an area-efficient way by splitting at least one of the load diffusion regions of one single nFET, thereby splitting the single nFET in two nFETs of the same gate width. The total transistor area can be reduced.

Figure 7:
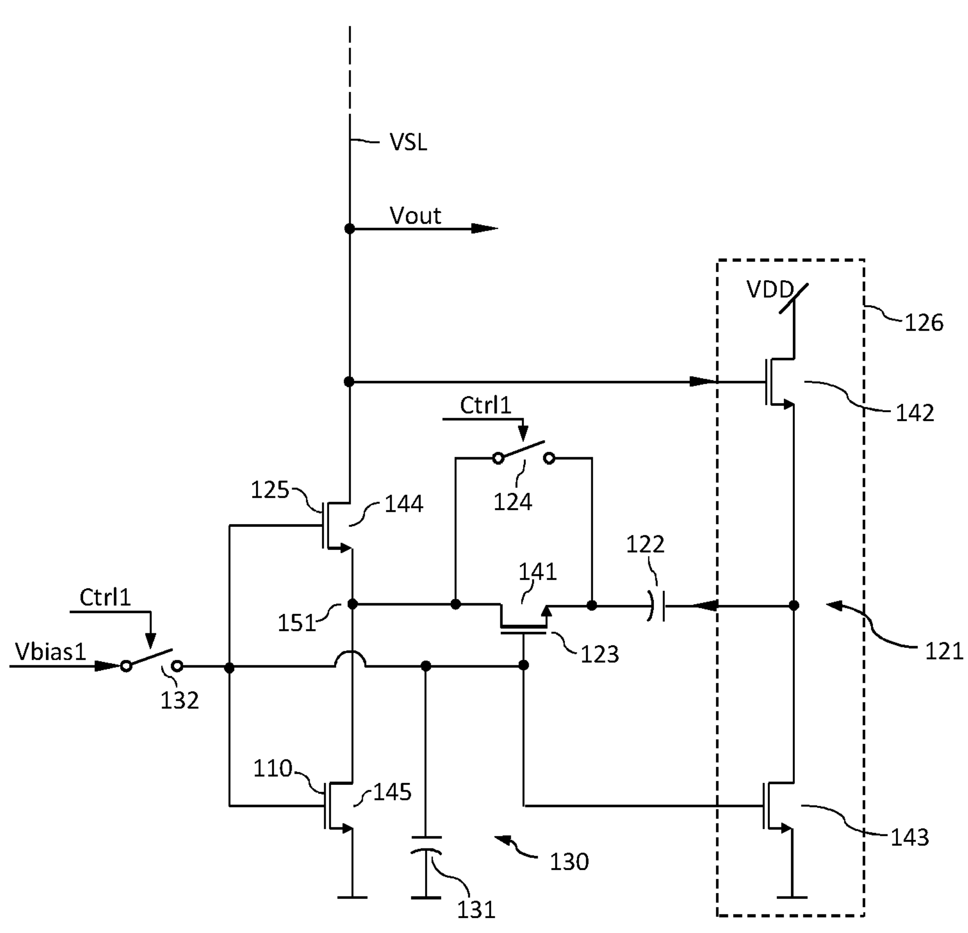
FIG. 7 is a simplified circuit diagram illustrating a configuration example of a part of a column signal processing unit according to an embodiment with commonly biased transistors.

In FIG. 7 the second switch 132 switches the same bias voltage Vbias to the gates of each of the first transistor 141, the third transistor 143, the fourth transistor 144 and the fifth transistor 145.

A common control signal Ctrl1 may control both the first switch 124 and the second switch 132 such that implementing the feedback circuit 120 may get along with only one additional control signal line for each data signal line VSL.

In the following, reference is made again to the solid-state imaging device 90 shown in FIG. 1 in combination with any of the feedback circuits 120 described with reference to FIGS. 2 to 7.

The solid-state imaging device 90 includes a plurality of pixel circuits 11P, wherein each pixel circuit 11P is configured to generate a pixel output signal with an amplitude related to an intensity of detected light. The pixel circuits 11P of the same pixel column are connected to a data signal line VSL.

The solid-state imaging device 90 further includes a column signal processing unit 14 as described with reference to any of FIGS. 2 to 6. In particular, the column signal processing unit 14 may include a current control circuit 110 electrically connected between the data signal line VSL and a supply reference potential GND, and a feedback circuit 120 configured to reduce a capacitive load of the data signal line VSL, wherein a feedback path 121 of the feedback circuit 120 includes a feedback capacitor 122 and a delay element 123 electrically connected in series to each other, and wherein the delay element 123 is configured to increase a time delay in the feedback path 121.

The amplitude of the pixel output signal may be related to the intensity of detected light in a proportional way for intensity readout. According to another example, the amplitude of the pixel output signal may be related to the intensity of detected light in a way that a binary value indicates a change of the intensity by a predefined amount.

The solid-state imaging device may further include a sensor controller 15. The feedback circuit 120 may further include a first switch 124, wherein the delay element 123 and the first switch 124 are electrically connected in parallel. The sensor controller 15 may be configured to generate and output a first control signal Ctrl1 for the first switch 124.

The sensor controller 15 may generate and output address and latch signals for a row decoder 12 and for a pixel driver unit 13 for selecting single rows of pixel circuits 11P in the pixel army unit 11. In addition, the sensor controller 15 may generate signals for controlling the column signal processing unit 14.

For example, the sensor controller 15 may generate a synchronization signal indicating the start of a readout cycle from the pixel array unit 11P, e.g. a global shutter signal, a sample and hold signal, a horizontal synchronization signal, or the like. The readout cycle may include a precharge period that charges the data signal line VSL to a predefined potential.

The sensor controller 15 may generate and output the first control signal Ctrl1 in response to the synchronization signal. For example, the first control signal Ctrl1 may be fully synchronous with the synchronization signal. Alternatively, at least one of the rising and falling edges of the first control signal Ctrl1 may have a predefined delay or a predefined advance with respect to the corresponding edge of the synchronization signal. For example, the column signal processing unit 14 may be configured to use a synchronization signal as the first control signal.

Figure 8:
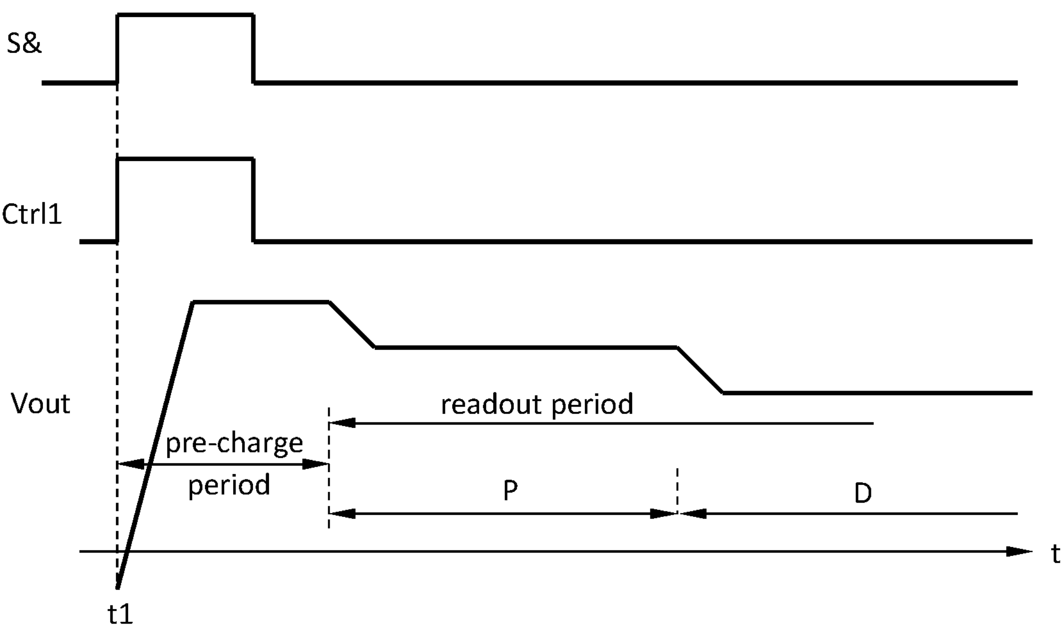
FIG. 8 is a simplified time chart for signals applied to the feedback circuit for discussing effects of the embodiments on pixel output signals on the data signal line.

FIG. 8 shows a first control signal Ctrl1 in full synchronization with a sample and hold signal S&H. The switches in the feedback circuit are set such that the delay element in the feedback path is reset and such that the data signal line VSL is charged to a potential as high as possible with regard to the supply reference potential GND. At the end of the pre-charge period, the pixel output signal Vout has a maximum value.

The following readout period may include a preset phase P and a data phase D. A voltage level of a pixel output signal Vout at the end of the preset phase P may indicate a current pixel offset voltage obtained as output signal of a pixel circuit with unilluminated photoelectric conversion element PD. A voltage level of the pixel output signal Vout at the end of the data phase D is a measure for incident light on the illuminated photoelectric conversion element PD. The settling time after which the voltage level of the pixel output signals Vout is stable after the transitions to the pre-charge period, to the preset phase P and to the data phase D, determines the readout speed.

Figure 9A:
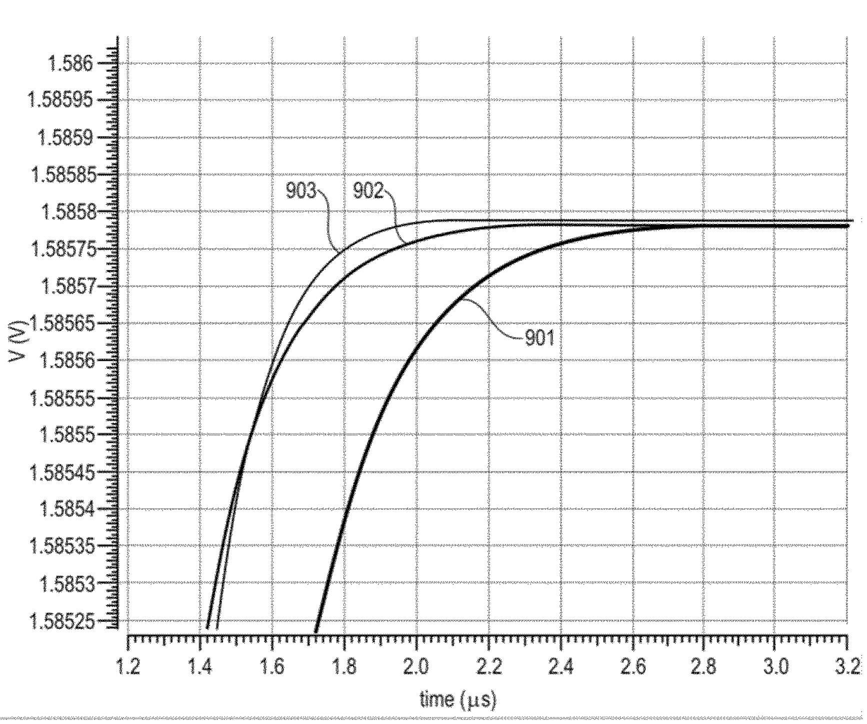
FIGS. 9A to 9B are simplified time charts for discussing effects of the embodiments on pixel output signals on the data signal line.

In FIG. 9A line 901 shows the transition of the pixel output signal Vout to the pre-charge level for a conventionally connected data signal line without any VSL accelerator. Line 902 shows the same transition with a VSL accelerator that includes a feedback circuit with a feedback capacitor with the capacitance Cf and without delay element. Line 903 shows the same transition with a VSL accelerator including a feedback circuit as described above and including a feedback capacitor with the capacitance Cf/2 and a self-biased resistor as delay element.

Figure 9B:
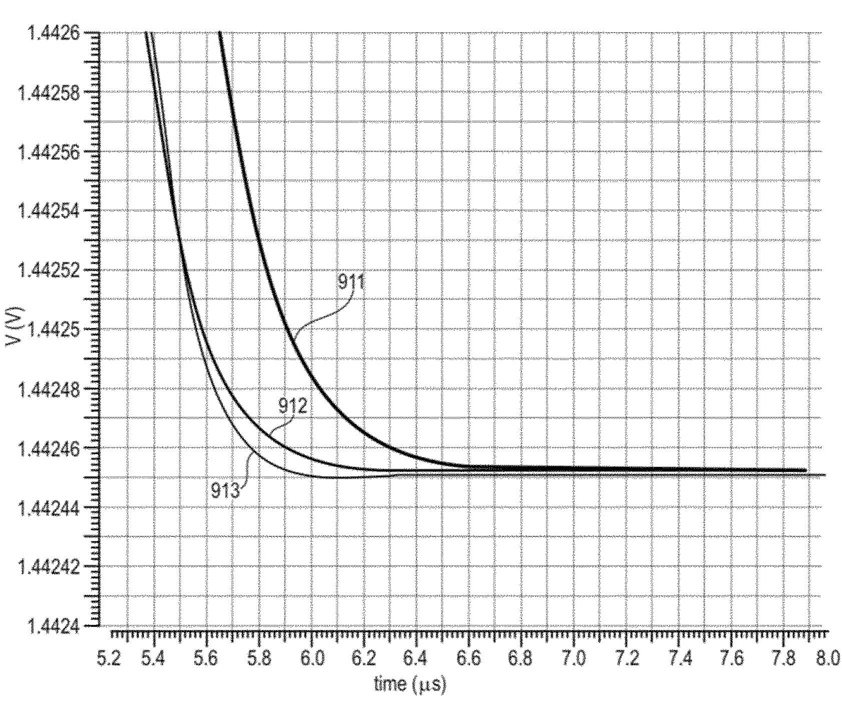

Accordingly, in FIG. 9B line 911 shows the transition of the pixel output signal Vout from the pre-charge level to a preset level for a conventionally connected data signal line without any VSL accelerator. Line 912 shows the same transition with a VSL accelerator that includes a feedback circuit with a feedback capacitor with the capacitance Cf and without delay element. Line 913 shows the same transition with a VSL accelerator including a feedback circuit as described above and including a feedback capacitor with the capacitance Cf/2 and a self-biased resistor as delay element.

With the self-biased resistor it is possible to drastically reduce the capacitance and, in particular, the size of the feedback capacitor without adverse impact on the settling time performance.

The feedback circuit 120 as described above can be combined with other types of pixel circuits 11P, e.g. with pixel circuits as shown by way of the two illustrative examples in the following.

Figure 10:
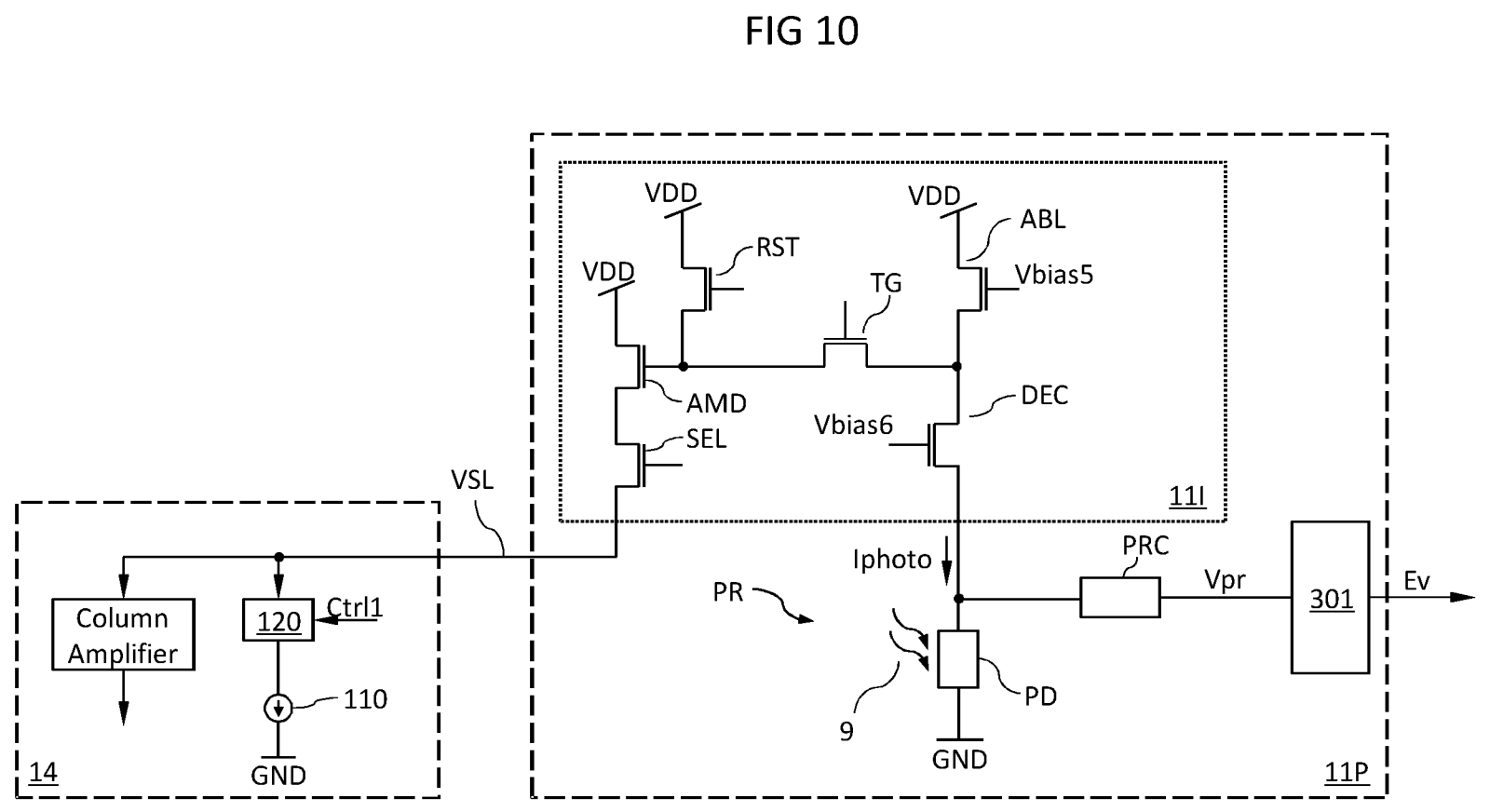

FIG. 10 refers to a pixel circuit 11P including an intensity readout circuit 111 and a photoreceptor module PR for event detection, wherein the intensity readout circuit 111 and the photoreceptor module PR share a common photoelectric conversion element PD. The photoreceptor module PR includes a photoreceptor circuit PRC that converts the photocurrent Iphoto into a photoreceptor signal Vpr, wherein a voltage of the photoreceptor signal Vpr is a function of the photocurrent Iphoto, and wherein in the range of interest the voltage of the photoreceptor signal Vpr increases with increasing photocurrent Iphoto. The photoreceptor circuit PRC may include a logarithmic amplifier. An event detector circuit 301 receives the photoreceptor signal Vpr and generates an event detection signal Ev when a change of the voltage level of the photoreceptor signal Vpr exceeds a predetermined threshold.

The intensity readout circuit 11I includes an n-channel anti-blooming transistor ABL and an n-channel decoupling transistor DEC which are electrically connected in series between the high supply voltage VDD and the photoelectric conversion device PD. The anti-blooming transistor ABL and the decoupling transistor DEC may be controlled by fixed bias voltages Vbias5, Vbias6 applied to the gates. Additional elements, e.g. a controlled path of a feedback portion of the photodetector circuit PRC may be electrically connected in series between the decoupling transistor DEC and the photoelectric conversion device PD.

Decoupling transistor DEC may basically decouple the photodetector circuit PRC from voltage transients at the center node between the decoupling transistor DEC and the transistor ABL. Anti-blooming transistor ABL may ensure that the voltage at the center node between the decoupling transistor DEC and the transistor ABL does not fall below a certain level given by the difference between the bias voltage Vbias5 at the gate of the anti-blooming transistor ABL and the threshold voltage of the anti-blooming transistor ABL in order to ensure proper operation of the photodetector circuit PRC.

The source of the n-channel transfer transistor TG is electrically connected to the center node between the decoupling transistor DEC and transistor ABL. For the further components of the intensity readout circuit 111, reference is made to the description of the pixel circuit 11P in FIG. 1.

Alternative embodiments of the intensity readout circuit 11I may be realized without transfer MOSFET, wherein the reset transistor RST may replace the anti-blooming transistor ABL, and wherein the source of the reset transistor RST is directly connected to the gate of the amplifier transistor AMP.

In the photoreceptor circuit block of FIG. 10, the intensity detection circuit 11I and the photoreceptor circuit PRC for event detection are electrically connected in series with respect to the photocurrent Iphoto, wherein evaluation of intensity and detection of events may be performed substantially contemporaneously.

Figure 11:
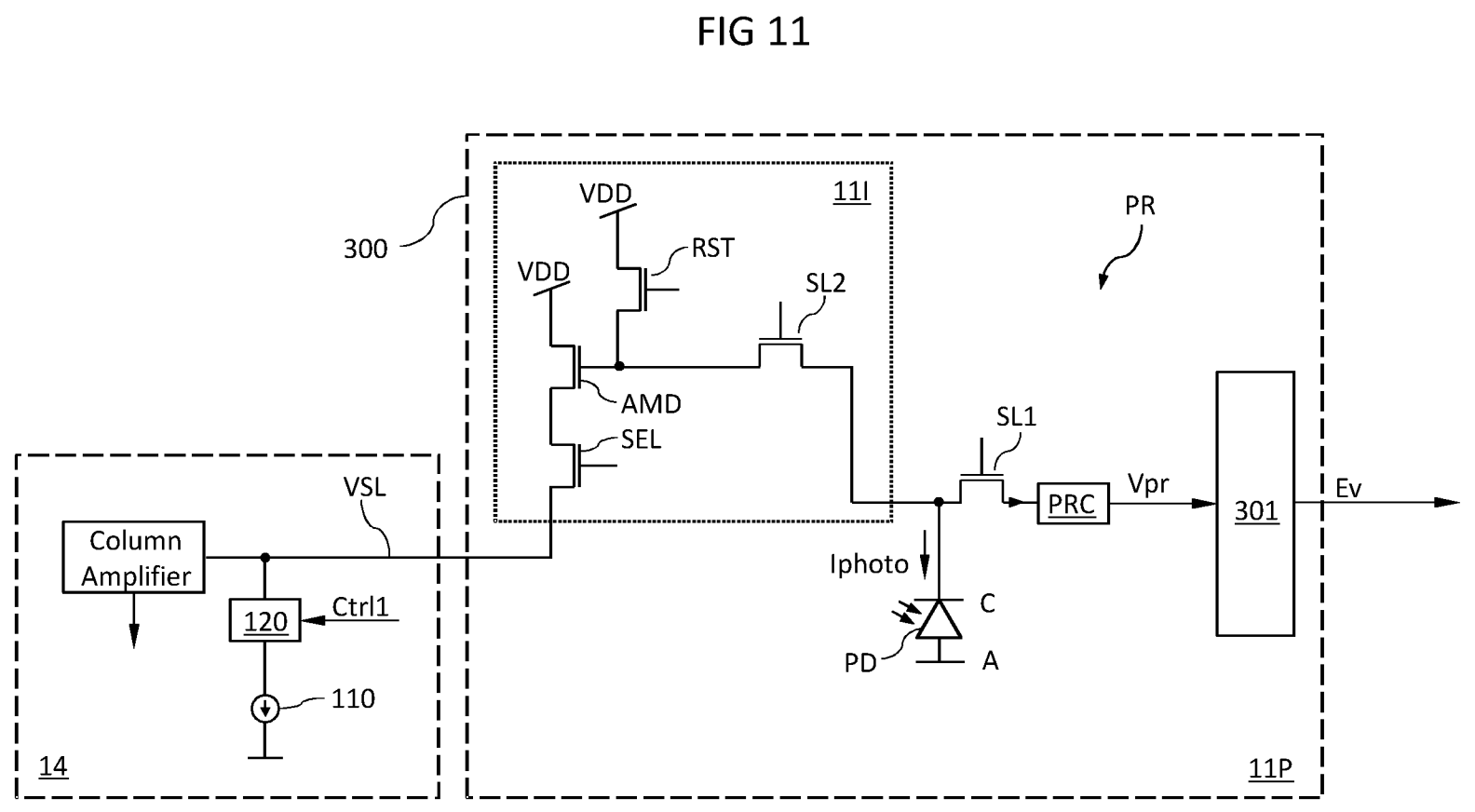

The pixel circuit 11P in FIG. 11 includes a first mode selector SL1 and a second mode selector SL2. The first mode selector SL1 is connected between the cathode of the photoelectric conversion element PD and a photoreceptor circuit PRC. The second mode selector SL2 is connected between the cathode of the photoelectric conversion element PD and the amplifier transistor AMP of an intensity readout circuit 11I.

The first and second mode selectors SL1, SL2 electrically connect the photoelectric conversion element PD with the photoreceptor circuit PRC in a first operating state and with the intensity readout circuit 11I in a second operating state. In addition, the first and second mode selectors SL1, SL2 may disconnect the photoelectric conversion element PD from the intensity readout circuit 11I in the first operating state and may disconnect the photoelectric conversion element PD from the photoreceptor circuit PRC in the second operating state. The first and second mode selectors SL1, SL2 may be electronic switches, for example FETs or transfer gates.

Figure 12:
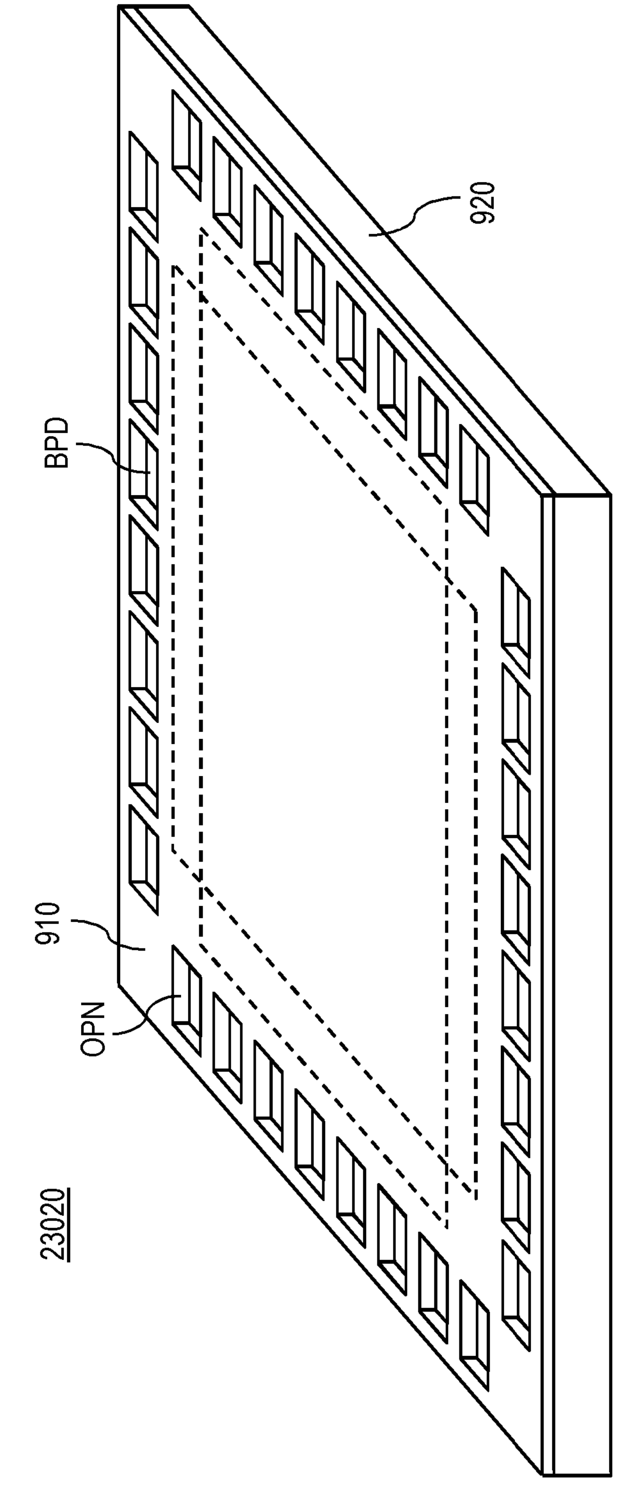
FIG. 12 illustrates an overview of a configuration example of a multi-layer solid-state imaging device to which a technology according to the present disclosure may be applied.

FIG. 12 is a perspective view showing an example of a laminated structure of a solid-state imaging device 23020 with a plurality of pixels arranged matrix-like in array form. Each pixel includes at least one photoelectric conversion element.

The solid-state imaging device 23020 has the laminated structure of a first chip (upper chip) 910 and a second chip (lower chip) 920.

The laminated first and second chips 910, 920 may be electrically connected to each other through TC(S)Vs (Through Contact (Silicon) Vias) formed in the first chip 910.

The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion elements arranged in array form.

For example, the first chip 910 may include only the photoelectric conversion elements of the pixel circuits as described above with reference to the preceding FIGS. Alternatively, the first chip 910 may include further elements of each pixel circuit. For example, the first chip 910 may include, in addition to the photoelectric conversion elements, at least the buffer transistor, the integration capacitor and/or the auxiliary transistor of the pixel circuits. Alternatively, the first chip 910 may include each element of the pixel circuit.

The second chip 920 may be mainly a logic chip (digital chip) that includes the elements complementing the elements on the first chip 910 to complete pixel circuits. The second chip 920 may also include analog circuits, for example circuits that quantize analog signals transferred from the first chip 910 through the TCVs.

The second chip 920 may have one or more bonding pads BPD and the first chip 910 may have openings OPN for use in wire-bonding to the second chip 920.

The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

Figure 13:
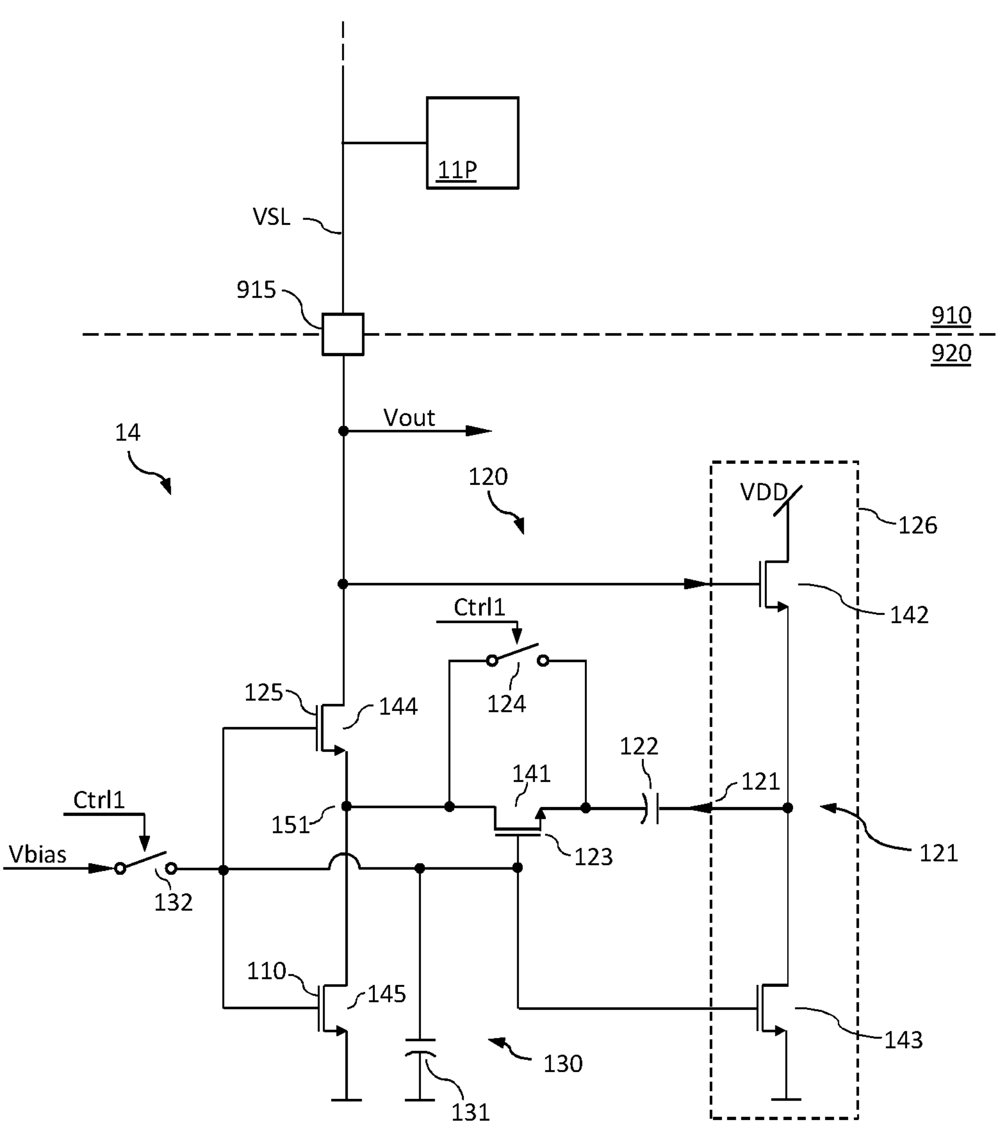
FIG. 13 is a schematic circuit diagram of elements of a column signal processing unit formed on a second chip of a solid-state imaging device with laminated structure according to an embodiment.

FIG. 13 shows a possible allocation of elements of a solid-stage imaging device across the first chip 910 and the second chip 920 of FIG. 12.

The first chip 910 may include the pixel circuits 11P with photoelectric conversion elements. The second chip 920 may include inter alia the column signal processing unit 14 with feedback circuits 120. One through contact via 915 per pixel circuit 100 may be part of the data signal line VSL and passes the pixel output signal Vout from the first chip 910 to the second chip 920.

Figure 14:
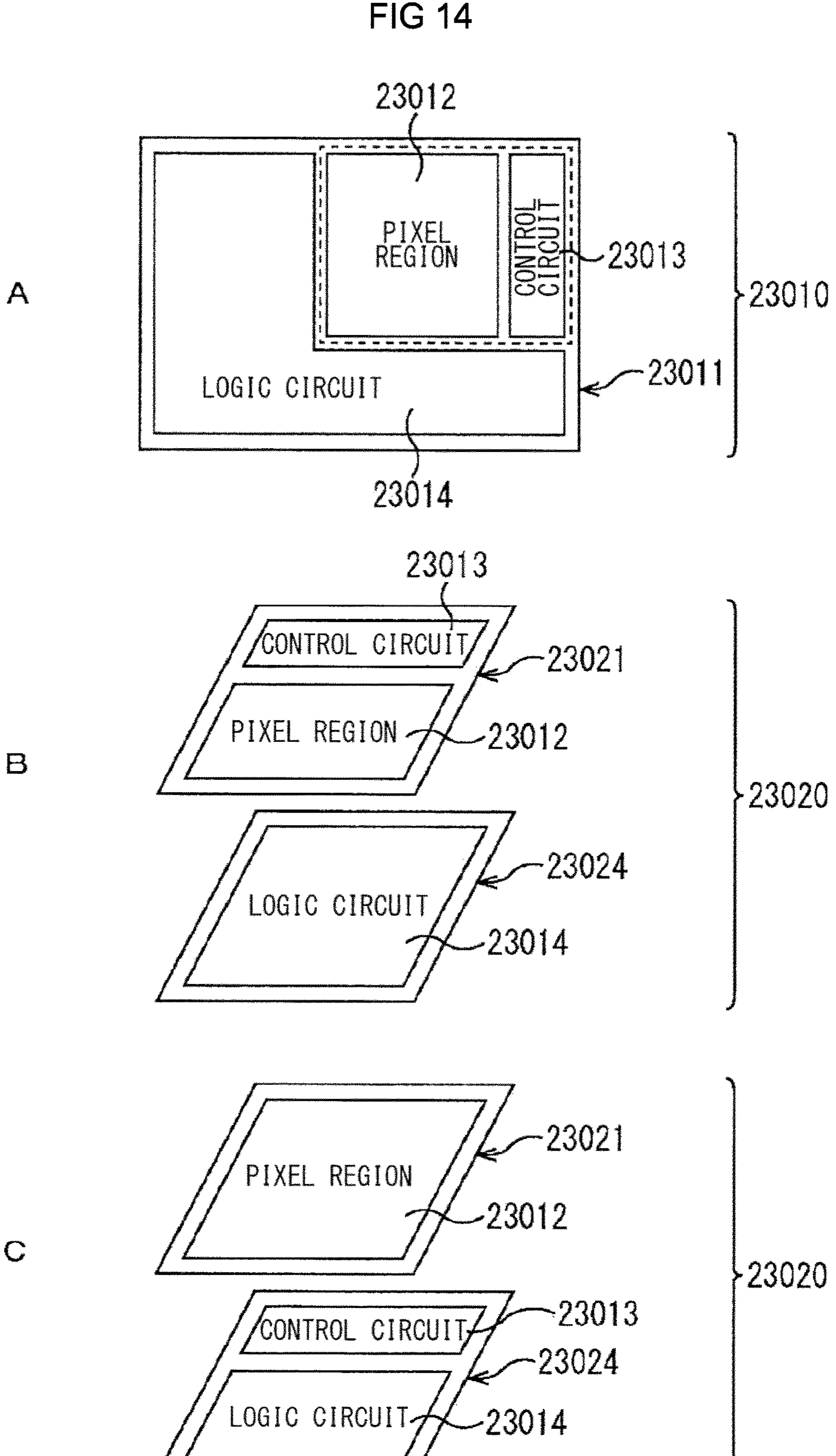
FIG. 14 illustrates an overview of a configuration example of a multi-layer solid-state imaging device to which a technology according to the present disclosure may be applied.

FIG. 14 illustrates schematic configuration examples of solid-state imaging devices 23010, 23020.

The single-layer solid-state imaging device 23010 illustrated in part A of FIG. 14 includes a single die (semiconductor substrate) 23011. Mounted and/or formed on the single die 23011 are a pixel region 23012 (photoelectric conversion elements), a control circuit 23013 (readout circuit, threshold controller), and a logic circuit 23014 (parts of pixel circuits, row driver, column signal processing unit). In the pixel region 23012, pixels are disposed in an array form. The control circuit 23013 performs various kinds of control including control of driving the pixels. The logic circuit 23014 performs signal processing.

Parts B and C of FIG. 14 illustrate schematic configuration examples of multi-layer solid-state imaging devices 23020 with laminated structure. As illustrated in parts B and C of FIG. 14, two dies (chips), namely a sensor die 23021 (first chip) and a logic die 23024 (second chip), are stacked in a solid-state imaging device 23020. These dies are electrically connected to form a single semiconductor chip.

With reference to part B of FIG. 14, the pixel region 23012 and the control circuit 23013 are formed or mounted on the sensor die 23021, and the logic circuit 23014 is formed or mounted on the logic die 23024. The logic circuit 23014 may include the column signal processing unit as described with reference to the preceding FIGS. The pixel region 23012 includes at least the photoelectric conversion elements.

With reference to part C of FIG. 14, the pixel region 23012 is formed or mounted on the sensor die 23021, whereas the control circuit 23013 and the logic circuit 23014 are formed or mounted on the logic die 23024.

According to another example (not illustrated), the pixel region 23012 and the logic circuit 23014, or the pixel region 23012 and parts of the logic circuit 23014 may be formed or mounted on the sensor die 23021, and the control circuit 23013 is formed or mounted on the logic die 23024.

FIG. 15 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 15, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include an image sensor assembly with a column signal processing unit according to the embodiments of the present disclosure or a solid-state imaging device with a column signal processing unit according to the embodiments of the present disclosure. The light received by the imaging section 12031 may be visible light, or may be invisible light such as infrared rays or the like.

The in-vehicle information detecting unit 12040 detects information about the inside of the vehicle and may be or may include a solid-state imaging device and with pixel circuits according to the embodiments of the present disclosure. The in-vehicle information detecting unit 12040 is, for example, connected with a driver state detecting section 12041 that detects the state of a driver. The driver state detecting section 12041, for example, includes a camera that includes the solid-stage imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 15, an audio speaker 12061, a display section 12062, and an instrument panel 12063 are illustrated as the output device. The display section 12062 may, for example, include at least one of an on-board display or a head-up display.

Figure 16:
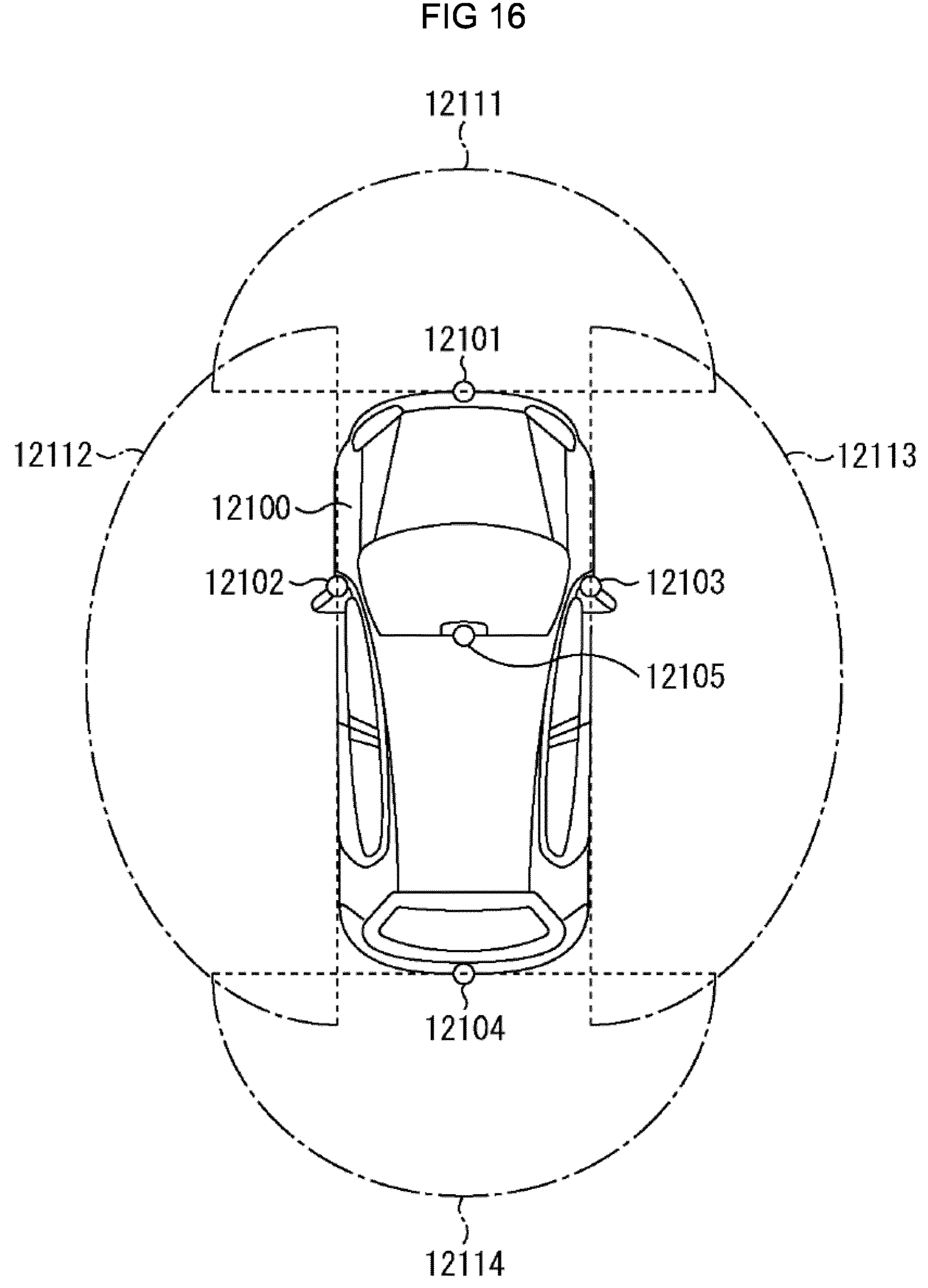
FIG. 16 is a diagram of assistance in explaining an example of installation positions of an outside-vehicle information detecting section and an imaging section of the vehicle control system of FIG. 15.

FIG. 16 is a diagram depicting an example of the installation position of the imaging section 12031, wherein the imaging section 12031 may include imaging sections 12101, 12102, 12103, 12104, and 12105.

The imaging sections 12101, 12102, 12103, 12104, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 16 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, imaging element having pixels for phase difference detection or may include a ToF module including a solid-state imaging device according to the present disclosure.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying the column signal processing unit according to the embodiments, the sensors can be provided at reduced size.

Additionally, embodiments of the present technology are not limited to the above-described embodiments, but various changes can be made within the scope of the present technology without departing from the gist of the present technology.

The solid-state imaging device according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

Note that the present technology can also be configured as described below:

(1) A column signal processing unit, including:

a current control circuit electrically connected between a data signal line and a supply reference potential;

a feedback circuit configured to reduce a capacitive load of the data signal line, wherein a feedback path of the feedback circuit includes a series connection of a feedback capacitor and a delay element, wherein the delay element is configured to increase a time delay in the feedback path.

(2) The column signal processing unit according to (1), wherein the feedback circuit includes a first switch, and wherein the delay element and the first switch are electrically connected in parallel.

(3) The column signal processing unit according to (1) or (2), wherein the delay element includes a load path of a first transistor.

(4) The column signal processing unit according to (3), further including:

a transistor bias circuit configured to supply a first bias voltage to a gate of the first transistor.

(5) The column signal processing unit according to (4), wherein the transistor bias circuit includes a bias voltage capacitor and a second switch, wherein the bias voltage capacitor is connected to the gate of the first transistor, and wherein the second switch is configured to connect the bias voltage capacitor with a bias voltage source in an on-state.

(6) The column signal processing unit according to (5), wherein the feedback path includes a controllable first switch, electrically connected in parallel with the delay element, and wherein the first switch and the second switch are controllable through a first control signal.

(7) The column signal processing unit according to any of (1) to (6), wherein the feedback circuit includes an amplifier circuit, wherein an input of the amplifier circuit is connected to the data signal line, and wherein an output of the amplifier circuit is connected to a second side of the feedback path.

(8) The column signal processing unit according to any of (1) to (7), wherein the amplifier circuit includes a second transistor and a third transistor, wherein load paths of the second transistor and the third transistor are in cascode configuration, and wherein the input of the amplifier circuit is connected to a gate of the second transistor.

(9) The column signal processing unit according to any of (1) to (8), wherein the feedback circuit further includes a sense element connected in series between the data signal line and the current control circuit, and wherein a first side of the feedback path is connected to a first node between the sense element and the current control circuit.

(10) The column signal processing unit according to (9), wherein the sense element includes a fourth transistor and the current control circuit includes a fifth transistor.

(11) The column signal processing unit according to (10), wherein the fifth transistor and the fourth transistor have a same gate width.

(12) A solid-state imaging device, including:

a plurality of pixel circuits, wherein each pixel circuit is configured to generate a pixel output signal with an amplitude related to an intensity of detected light, and wherein the pixel circuits are connected to a data signal line; and a column signal processing unit, wherein the column signal processing unit includes a current control circuit electrically connected between the data signal line and a supply reference potential, and a feedback circuit configured to reduce a capacitive load of the data signal line, wherein a feedback path of the feedback circuit includes a feedback capacitor and a delay element electrically connected in series, and wherein the delay element is configured to increase a time delay in the feedback path.

(13) The solid-state imaging device according to (12), further including a sensor controller, wherein the feedback circuit includes a first switch, and wherein the delay element and the first switch are electrically connected in parallel, and wherein the sensor controller is configured to generate and output a first control signal for the first switch.

(14) The solid-state imaging device according to (13), wherein the sensor controller is configured to generate and output the first control signal in response to a synchronization signal.

(15) The solid-state imaging device according to (13), wherein the column signal processing unit is configured to use a synchronization signal as the first control signal.

The invention claimed is:

1. A column signal processing unit, comprising:

a current control circuit electrically connected between a data signal line and a supply reference potential; and a feedback circuit configured to reduce a capacitive load of the data signal line, wherein a feedback path of the feedback circuit comprises a series connection of (i) a feedback capacitor including two conductive materials separated by a non-conductive material and (ii) a delay element, and wherein the delay element is configured to increase a time delay in the feedback path.

2. The column signal processing unit according to claim 1, wherein the feedback circuit comprises a first switch, and wherein the delay element and the first switch are electrically connected in parallel.

3. The column signal processing unit according to claim 1, wherein the delay element comprises a load path of a first transistor.

4. The column signal processing unit according to claim 3, further comprising:

a transistor bias circuit configured to supply a first bias voltage to a gate of the first transistor.

5. The column signal processing unit according to claim 4, wherein the transistor bias circuit comprises a bias voltage capacitor and a second switch, wherein the bias voltage capacitor is connected to the gate of the first transistor, and wherein the second switch is configured to connect the bias voltage capacitor with a bias voltage source in an on-state.

6. The column signal processing unit according to claim 5, wherein the feedback path comprises a first switch electrically connected in parallel with the delay element, and wherein the first switch and the second switch are controllable through a first control signal.

7. The column signal processing unit according to claim 1, wherein the feedback circuit comprises an amplifier circuit, wherein an input of the amplifier circuit is connected to the data signal line, and wherein an output of the amplifier circuit is connected to a second side of the feedback path.

8. The column signal processing unit according to claim 7, wherein the amplifier circuit comprises a second transistor and a third transistor, wherein load paths of the second transistor and the third transistor are electrically connected in series, and wherein the input of the amplifier circuit is connected to a gate of the second transistor.

9. The column signal processing unit according to claim 1, wherein the feedback circuit further comprises a sense element connected in series between the data signal line and the current control circuit, and wherein a first side of the feedback path is connected to a first node between the sense element and the current control circuit.

10. The column signal processing unit according to claim 9, wherein the sense element comprises a fourth transistor and the current control circuit comprises a fifth transistor.

11. The column signal processing unit according to claim 10, wherein the fifth transistor and the fourth transistor have a same gate width.

12. The column signal processing unit according to claim 1, further comprising a bias circuit configured to supply a first bias voltage to the delay element.

13. A solid-state imaging device, comprising:

a plurality of pixel circuits, wherein each pixel circuit is configured to generate a pixel output signal with an amplitude related to an intensity of detected light, and wherein the pixel circuits are connected to a data signal line; and a column signal processing unit, wherein the column signal processing unit comprises:

a current control circuit electrically connected between the data signal line and a supply reference potential, and a feedback circuit configured to reduce a capacitive load of the data signal line, wherein a feedback path of the feedback circuit comprises (i) a feedback capacitor including two conductive materials separated by a non-conductive material and (ii) a delay element electrically connected in series, and wherein the delay element is configured to increase a time delay in the feedback path.

14. The solid-state imaging device according to claim 13, further comprising a sensor controller, wherein the feedback circuit comprises a first switch, wherein the delay element and the first switch are electrically connected in parallel, and wherein the sensor controller is configured to generate and output a first control signal for the first switch.

15. The solid-state imaging device according to claim 14, wherein the sensor controller is configured to generate and output the first control signal in response to a synchronization signal.

16. The solid-state imaging device according to claim 14, wherein the column signal processing unit is configured to use a synchronization signal as the first control signal.

* * * * *